United States Patent
Wu et al.

[11] Patent Number: 6,118,491
[45] Date of Patent: Sep. 12, 2000

[54] SYSTEM AND METHOD FOR ENFORCING INTERLACED FIELD SYNCHRONIZATION IN THE PRESENCE OF BROKEN ALTERNATION IN AN MPEG VIDEO DATASTREAM

[75] Inventors: Scarlett Wu, Hillsborough; Darren D Neuman, San Jose; Robert F Bishop, Morgan Hill, all of Calif.

[73] Assignee: LSI Logic Corporation, Milpitas, Calif.

[21] Appl. No.: 08/803,504

[22] Filed: Feb. 20, 1997

[51] Int. Cl.[7] ...................................................... H04N 5/08
[52] U.S. Cl. ........................ 348/526; 348/439; 348/911; 348/441
[58] Field of Search ..................... 348/401, 415, 348/439, 911, 513, 526, 558, 459, 470, 411, 466

[56] References Cited

U.S. PATENT DOCUMENTS

| | | | |
|---|---|---|---|
| 5,461,420 | 10/1995 | Yonemitsu et al. | 348/911 |
| 5,600,376 | 2/1997 | Casavant et al. | 348/558 |
| 5,646,693 | 7/1997 | Cismas | 348/44 |
| 5,734,420 | 3/1998 | Lee et al. | 348/441 |
| 5,982,444 | 11/1999 | Kato et al. | 348/446 |

*Primary Examiner*—Victor R. Kostak
*Attorney, Agent, or Firm*—Conley, Rose, & Tayon

[57] ABSTRACT

A system and method for synchronizing a decoded, interlaced-field data stream with an interlaced field display. A system for displaying an MPEG encoded data stream includes an MPEG decoder which converts the encoded data stream into a sequence of frames. Each frame has an associated top field, bottom field, top-field-first flag, and repeat-first-field flag. The system also includes a display processor which receives the flags and determines a field display sequence for each frame which conforms to an overall display sequence which strictly alternates between top and bottom fields. This strict alternation in enforced even when the decoded field sequence does not adhere to a strict alternation. The system achieves this result with a worst-case temporal distortion of one field by inserting or omitting a 3:2 pulldown frame at each broken alternation point.

10 Claims, 2 Drawing Sheets

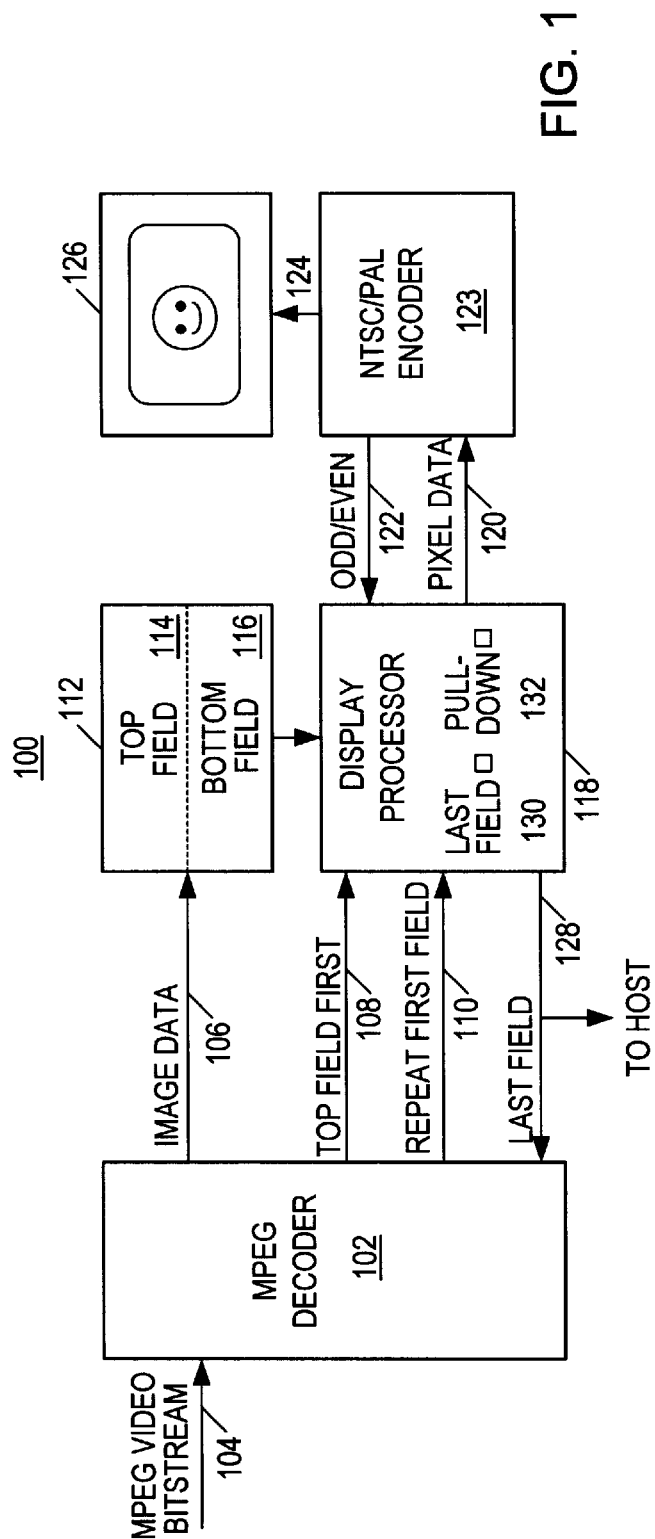

SYSTEM AND METHOD FOR ENFORCING INTERLACED FIELD SYNCHRONIZATION IN THE PRESENCE OF BROKEN ALTERNATION IN AN MPEG VIDEO DATASTREAM

BACKGROUND OF THE INVENTION

1. Field of the Invention

The present invention relates generally to digital video compression, and more particularly to a system for displaying field structure encoded MPEG video data streams which lack a strictly enforced alternation of top and bottom fields.

2. Description of the Related Art

Video Compression Background

Full-motion digital video requires a large amount of storage and data transfer bandwidth. Thus, video systems use various types of video compression algorithms to reduce the amount of necessary storage and transfer bandwidth. In general, different video compression methods exist for still graphic images and for full-motion video. Intraframe compression methods are used to compress data within a still image or single frame using spatial redundancies within the frame. Interframe compression methods are used to compress multiple frames, i.e., motion video, using the temporal redundancy between the frames. Interframe compression methods are used exclusively for motion video, either alone or in conjunction with intraframe compression methods.

Intraframe, or still image, compression techniques generally use frequency domain techniques, such as the discrete cosine transform (DCT). Intraframe compression typically uses the frequency characteristics of a picture frame to efficiently encode a frame and remove spatial redundancy. Examples of video data compression for still graphic images are JPEG (Joint Photographic Experts Group) compression and RLE (run-length encoding). JPEG compression is a group of related standards that use the discrete cosine transform (DCT) to provide either lossless (no image quality degradation) or lossy (imperceptible to severe degradation) compression. Although JPEG compression was originally designed for the compression of still images rather than video, JPEG compression is used in some motion video applications. The RLE compression method operates by testing for duplicated pixels in a single line of the bit map and storing the number of consecutive duplicate pixels rather than the data for the pixels themselves.

In contrast to compression algorithms for still images, most video compression algorithms are designed to compress full motion video. As mentioned above, video compression algorithms for motion video use a concept referred to as interframe compression to remove temporal redundancies between frames. Interframe compression involves storing only the differences between successive frames in the data file. Interframe compression stores the entire image of a key frame or reference frame, generally in a moderately compressed format. Successive frames are compared with the key frame, and only the differences between the key frame and the successive frames are stored. Periodically, such as when new scenes are displayed, new key frames are stored, and subsequent comparisons begin from this new reference point. It is noted that the interframe compression ratio may be kept constant while varying the video quality. Alternatively, interframe compression ratios may be content-dependent, i.e., if the video clip being compressed includes many abrupt scene transitions from one image to another, the compression is less efficient. Examples of video compression which use an interframe compression technique are MPEG, DVI and Indeo, among others.

MPEG Background

A compression standard referred to as MPEG (Moving Pictures Experts Group) compression is a set of methods for compression and decompression of full motion video images which uses the interframe and intraframe compression techniques described above. MPEG compression uses both motion compensation and discrete cosine transform (DCT) processes, among others, and can yield compression ratios of more than 200:1.

The two predominant MPEG standards are referred to as MPEG-1 and MPEG-2. The MPEG-1 standard generally concerns inter-field data reduction using block-based motion compensation prediction (MCP), which generally uses temporal differential pulse code modulation (DPCM). The MPEG-2 standard is similar to the MPEG-1 standard, but includes extensions to cover a wider range of applications, including interlaced digital video such as high definition television (HDTV).

Interframe compression methods such as MPEG are based on the fact that, in most video sequences, the background remains relatively stable while action takes place in the foreground. The background may move, but large portions of successive frames in a video sequence are redundant. MPEG compression uses this inherent redundancy to encode or compress frames in the sequence.

An MPEG stream includes three types of pictures, referred to as the Intraframe (I), the Predicted frame (P), and the Bi-directional Interpolated frame (B). The I or Intraframes contain the video data for the entire frame of video and are typically placed every 10 to 15 frames. Intraframes provide entry points into the file for random access, and are generally only moderately compressed. Predicted frames are encoded with reference to a past frame, i.e., a prior Intraframe or Predicted frame. Thus P frames only include changes relative to prior I or P frames. In general, Predicted frames receive a fairly high amount of compression and are used as references for future Predicted frames. Thus, both I and P frames are used as references for subsequent frames. Bi-directional pictures include the greatest amount of compression and require both a past and a future reference in order to be encoded. Bi-directional frames are never used as references for other frames.

It is noted that MPEG compression is based on two types of redundancies in video sequences, these being spatial, which is the redundancy in an individual frame, and temporal, which is the redundancy between consecutive frames. Spatial compression is achieved by considering the frequency characteristics of a picture frame. Each frame is divided into non-overlapping blocks and respective sub-blocks, and each block is transformed via the discrete cosine transform (DCT).

Because of the picture dependencies, i.e., the temporal compression, the order in which the frames are transmitted, stored, or retrieved is not necessarily the display order, but rather an order required by the decoder to properly decode the pictures in the data stream. For example, a typical sequence of frames, in display order, might be shown as follows:

| I | B | B | P | B | B | P | B | B | P | B | B | I | B | B | P | B | B | P |
|---|---|---|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 | 16 | 17 | 18 |

By contrast, the data stream order corresponding to the given display order would be as follows:

| I | P | B | B | P | B | B | P | B | B | I | B | B | P | B | B | P | B | B |
|---|---|---|---|---|---|---|---|---|---|---|---|---|---|---|---|---|---|---|
| 0 | 3 | 1 | 2 | 6 | 4 | 5 | 9 | 7 | 8 | 12 | 10 | 11 | 15 | 13 | 14 | 18 | 16 | 17 |

Because the B frame depends on a subsequent I or P frame in display order, the I or P frame must be transmitted and decoded before the dependent B frame.

The video decoding process is generally the inverse of the video encoding process and is employed to reconstruct a motion picture sequence from a compressed and encoded data stream. The data in the data stream is decoded according to a syntax that is defined by the data compression algorithm. The decoder must first identify the beginning of a coded frame, identify the type of frame, then decode the image data in each individual frame. In accordance with the discussion above, the frames may also need to be re-ordered before they are displayed in accordance with their display order instead of their coding order. After the frames are re-ordered, they may then be displayed on an appropriate display device.

As the encoded video data is decoded, the decoded data is stored into a frame store buffer. The decoded data is in the form of decompressed or decoded I, P or B frames. A display controller retrieves the frame data for display by an appropriate display device, such as a TV monitor or the like. The present disclosure relates to MPEG-2 decoders compliant with International Standards Organization/International Electro-technical Commission (ISO/IEC) 2-13818 for supporting NTSC (National Television Standards Committee) or PAL (Phase Alternating Line) standards. The NTSC standard is primarily for use in the United States (U.S.), whereas the PAL standard is primarily for use in Europe.

A television picture is typically comprised of two fields, referred to as the top and bottom field. The top field contains every other scan line in the picture beginning with the first scan line. The bottom field contains every other line beginning with the second line. In other words, the top field comprises the odd horizontal scan lines, and the bottom field comprises the even horizontal scan lines. A television scans or draws all the top field lines, followed by all the bottom field lines, in an interlaced fashion. Hence, the display controller preferably provides the top and bottom fields to the display in strict alternation.

A picture encoded using the MPEG2 coding standard may be encoded in either a progressive or interlaced format, referred to as a frame picture structure or field picture structure, respectively. Where a video sequence is encoded using the field structure, i.e., in interlaced format, problems may arise in the decoding because the field picture structure is decoded in an interlaced order which may not be synchronized with the interlaced order of the display sequence. While the display order of top and bottom fields occurs in strict alternation, the order within the decoded sequence may not adhere to a strict alternation. The use of a technique known as 3:2 pulldown naturally provides for an evolution of the decoded field order, which under normal decoding circumstances yields a strictly alternating field presentation to the display.

A repeat-first-field flag is associated with each frame in an MPEG sequence encoded for pulldown. This repeat-first-field flag is asserted for frames in which a 3:2 pulldown, i.e. a repeat of the first field subsequent to the display of the second field. This results in the current frame extending over three field intervals rather than the normal two. Use of periodic pulldowns provides a technique for frame-rate conversion, for example, 24 frames per second may be converted to 30 frames per second by executing a pulldown for every-other frame.

In a well-encoded MPEG data stream, the encoder will set each frame's top-field-first and repeat-first-field indicators such that each frame's last field is the opposite of the next frame's first field, e.g., if frame $P_0$ ends on a bottom field, then frame $P_1$ begins on a top field. Although a good encoder will generate this alternation, it is not required by the MPEG standard. Also, even if all encoders generate this alternation, the alternation can be broken when multiple data streams are indiscriminately concatenated to form a new data stream.

One source of such concatenation is commercial advertisements. A broadcaster may concatenate clips from several different movies, insert non-3:2 pulldown commercials into a movie, or distribute such commercials among concatenated movie clips. Such mixing may break the alternation described above. A frame's last field may be the same as the next frame's first field, rather than the opposite.

Under such conditions, the decoder could present fields in the wrong order. The encoder encodes fields in the temporal order in which it intends the decoder to present them. If the encoder intends the top field to be presented first, the encoder encodes the top field first. The same is true for the bottom field. If the decoder presents the top field when it should have presented the bottom field, field inversion occurs. If the decoder avoids field inversion by reversing the time order of the top and bottom fields, temporal distortion occurs.

An interruption of the desired field alternation can result in a sustained, undesirable field inversion. A field inversion occurs when the bottom field is displayed on the odd lines and the top field is displayed on the even lines. This provides a noticeable distortion in the display. Consider a smooth diagonal line traversing the display. Field inversion will cause this line to have zig-zag, or jagged, edges.

Similarly, an interruption of the desired field alternation can result in a sustained, undesirable time distortion. A time distortion occurs when the top and bottom fields are displayed in a time reversed order. This too causes a noticeable distortion. Consider an object moving from left to right across the display. During temporal distortion, the object momentarily appears to reverse direction. While a one-occurrence time reversal is typically unnoticeable, when this distortion persists the motion on the display becomes noticeably jerky.

The amount of memory is a major cost item in the production of video decoders. Thus, it is desired to provide a solution to the described problem without increasing the memory requirements more than is essential.

SUMMARY OF THE INVENTION

The problems outlined above are in large part solved by a system and method for synchronizing a decoded, interlaced-field data stream with an interlaced-field display. In one embodiment, a system for displaying an MPEG encoded data stream includes an MPBG decoder which converts the encoded data stream into a sequence of frames. Each frame has an associated top field, bottom field, top-field-first flag, and repeat-first-field flag. The system includes a display processor which receives the flags and determines a field display sequence for each frame which conforms to strict alternation display timing requirements. This strict alternation is enforced even when the decoded field sequence does not adhere to a strict alternation. The system achieves this result with a worst-case temporal distortion of one field by inserting or omitting a 3:2 pulldown frame at each broken alternation point.

Broadly speaking, the present invention contemplates a system for synchronizing a decoded interlaced field data stream with an interlaced field display. The system includes an MPEG decoder which receives an MPEG video data stream. The decoder decodes the data stream to produce for each frame (i) a top field T, (ii) a bottom field B, (iii) a top-field-first flag F, and (iv) a repeat-first-field flag R. The system also includes a display processor coupled to receive the flags. The display processor determines a previous-frame last-field flag L and a pulldown execution flag E to determine a display sequence of fields for each frame. The display sequence is T,B,T when L and E are both asserted, T,B when L is asserted and E is de-asserted, B,T,B when L is de-asserted and E is asserted, and B,T when both L and E are de-asserted.

The present invention further contemplates a method for synchronizing a decoded interlaced field data stream with an interlaced field display. The method includes the step of determining a previous-frame last field flag $L_{t-1}$, which is 0 when a previous frame has a top field displayed last, and 1 when the previous frame has a bottom field displayed last. The method also includes the step of determining a desired current-frame first field flag $F_t$, which is 1 when a top field in a current frame precedes a bottom field, and 0 when the bottom field in the current frame precedes the top field. The method further includes the step of determining a current-frame repeat-first-field flag $R_t$, which is 1 to indicate a desired pulldown execution, and 0 to indicate a desired pulldown non-execution. The method still further includes the step of determining a pulldown execution flag $E_t$ according to the equation $E_t = L_{t-1} \oplus F_t \oplus R_t$, and executing a pulldown when $E_t$ is 1.

BRIEF DESCRIPTION OF THE DRAWINGS

Other objects and advantages of the invention will become apparent upon reading the following detailed description and upon reference to the accompanying drawings in which:

FIG. 1 is a block diagram of a system for displaying an MPEG encoded data stream according to the present invention;

FIG. 2 is an illustration of a method for synchronizing encoded interlaced fields to hardware enforced timing constraints.

Figure 3:
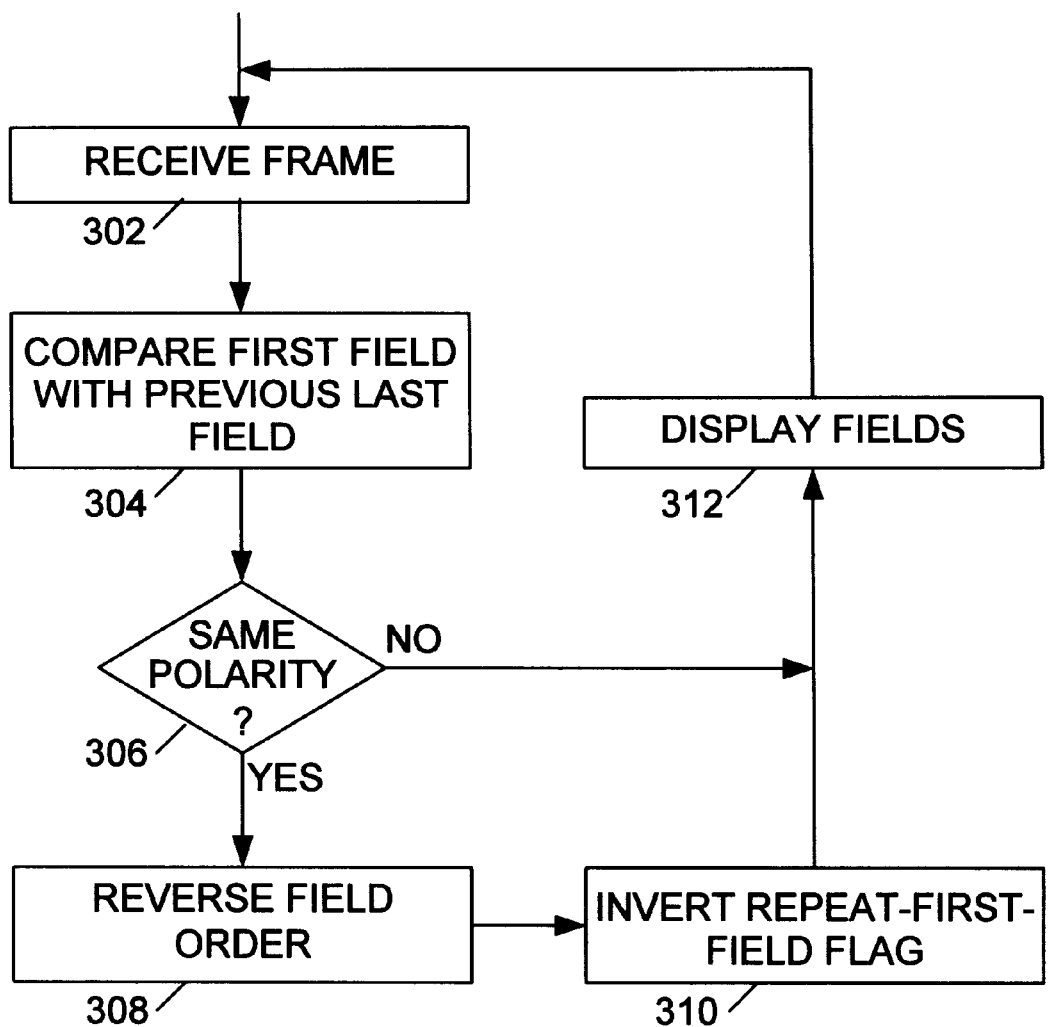
FIG. 3 is a flowchart of one embodiment of the synchronization method.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of an MPEG decode and display system 100 is shown. System 100 advantageously provides a method for synchronizing a decoded sequence of interlaced fields with a display which requires a strict alternation of interlaced fields. System 100 includes an MPEG decoder 102 which receives an encoded MPEG video data stream 104. Decoder 102 converts data stream 104 into a sequence of frames, wherein each frame has image data 106, a top-field-first flag 108, and a repeat-first-field flag. Image data 106 is written to a frame buffer 112 where it is stored in the form of a top field 114 and a bottom field 116. A display processor 118 reads from frame buffer 112 to provide the fields as pixel data 120 to NTSC/PAL encoder 123 in a display sequence that conforms to a strict top/bottom field alternation as dictated by an odd/even signal 122. Encoder 123 converts pixel data 120 into a scan signal 124 suitable for showing the frame image on display 126. To prevent overwriting of needed image data contained in frame buffer 112, processor 118 additionally provides a last-field signal 128 for the purpose of indicating to decoder 102 when the last field of the current frame has been written.

In order to prevent persistent temporal distortion in streams without encoded strict field alternation, processor 118 cannot simply execute a 3:2 pulldown based on the top-field-first and repeat-first-field flags of the current frame. Instead, processor 118 considers these flags together with the polarity of the last field of the previous frame. To determine whether to execute a 3:2 pulldown, processor 118 first determines the polarity of the last field of the previous frame. Processor 118 then executes a 3:2 pulldown only if it is necessary to cause the current frame to end on the field polarity specified by the top-field-first and repeat-first-field flags of the current frame.

FIG. 2 depicts encoded frames having junctures representing various scenarios in which processor 118 operates to maintain field synchronization. The junctures are represented by the vertical lines. The first row in FIG. 2 shows a number for each frame to simplify later discussion. The second row shows the encoded top (T) and bottom (B) fields in each frame, with the order indicating the encoded time order of the fields. The data stream includes a repeat-first-field flag which indicates when a 3:2 pulldown is to be executed. The third row shows the desired repetitions which provide the desired pulldown as indicated by the repeat-first-field flag. For example, in time interval 3 a first-field repetition is provided to increase the number of fields for the frame 1 from two to three. The fourth row shows the interleaved field display timing, requiring that the odd lines (top field) be displayed in odd time intervals and that the even lines (bottom field) be displayed in the even time intervals. The fifth row illustrates the ideal field display order given the restrictions provided by the display timing.

The following two points are emphasized. First, the encoded data stream indicates which field should be presented first. If the encoded data stream has a frame with the bottom field first, the processor should present the bottom field first. If the encoded data stream has a frame with the top field presented first, the processor should present the top field first. Second, the display hardware always determines which field is presented, regardless of the encoded field order. During even time intervals, the bottom field is presented, and during odd field time, the top field is presented. Note that the odd/even polarity of the display timing (fourth row) always alternates. It is possible for these operations to conflict.

FIG. 2 shows frame 1 with a displayed last field of polarity "top" and frame 2 with a desired first field of polarity "bottom". Since this does not violate the display timing requirements, the desired non-execution of pulldown for frame 2 is honored. Frame 2 consequently has a displayed last field of polarity "top". A splice which causes the encoded sequence to violate display timing requirements is shown between frames 2 and 3. Frame 3 has a desired first field of polarity "top". Since this would violate the display timing requirements, the fields are displayed in reverse order, causing a one-field temporal distortion. To prevent the propagation of temporal distortion, processor 118 allows the current frame to end on the desired field by not performing the desired pulldown. Frames 4 and 5 can then be displayed in the encoded timing order without violating further timing requirements. Since the violations do not occur, pulldowns for these frames are executed as desired.

Between frames 5 and 6, another splice which violates timing requirements is shown. Frame 5 has a displayed last field polarity of "bottom" and frame 6 has a desired first field polarity of "bottom". As before, the fields of the current frame are reversed, producing a one-field temporal distortion. This time, however, no pulldown is indicated by the encoded sequence. Consequently, to cause the current field to end on the desired field and keep the temporal distortion from propagating, a pulldown is executed. This allows the encoded order of frames 7 and 8 to be displayed without violating timing requirements. Since no violations occur, pulldowns for these frames are executed as desired.

Returning to FIG. 1, processor 118 is shown having a storage element for last-field flag 130 and a register for pulldown execution flag 132. Processor 118 determines the last field flag for a frame by taking the exclusive-or (XOR) of the top-field-first and repeat-first-field flags associated with the frame. This is shown in the table below, assuming that a value of 0 for the last field flag indicates that the last field was a top field, and similarly a value of 1 indicates a bottom field.

| top-field-first | repeat-first-field | last-field |
|---|---|---|
| 0 | 0 | 0 |
| 0 | 1 | 1 |
| 1 | 0 | 1 |
| 1 | 1 | 0 |

The processor 118 retains the last-field flag of the previous frame to determine a 3:2 pulldown execution flag for the current frame. The assertion of this flag results in processor 118 repeating the first field of the current frame to execute a 3:2 pulldown. The decision whether to execute 3:2 pulldown can be made by taking the XOR of the previous frame's last-field flag and the current frame's last field flag. In a preferred embodiment, this is accomplished using the current frame's top-field-first and repeat-first-field flags, as indicated by the table below. The t−1 subscript indicates values for the previous frame, and the t subscript indicates values for the current frame.

| last-field$_{t-1}$ | top-field-first$_t$ | repeat-first-field$_t$ | execute-pulldown$_t$ |
|---|---|---|---|
| 0 | 0 | 0 | 0 |
| 0 | 0 | 1 | 1 |
| 0 | 1 | 0 | 1 |
| 0 | 1 | 1 | 0 |
| 1 | 0 | 0 | 1 |
| 1 | 0 | 1 | 0 |
| 1 | 1 | 0 | 0 |
| 1 | 1 | 1 | 1 |

The described synchronization method may be accomplished using a hardware embodiment or a software embodiment. In an exemplary software embodiment, last-field signal 128 is used as an interrupt signal for a host processor. Upon receiving the interrupt, the host processor reads from display processor 118 the relevant flags, performs the pulldown determination, and sets the execute pulldown flag accordingly.

FIG. 3 shows a flowchart of one embodiment which may be executed with the aid of a host processor. In step 302, the previous frame has been displayed, and a current frame is received. In step 304, a comparison is performed to determine if the first field of the current frame is of the same polarity of the last field of the previous frame. A decision is made in step 306 on the basis of this comparison. If the polarities are equal, then in step 308, the second field of the current frame is placed ahead of the first field in the display sequence. Next, in step 310, the repeat-first-field flag is inverted to ensure that the current frame will end on the desired last field. At this point, or if the polarities were determined to be different in step 306, then in step 312 the fields are displayed for the current frame.

Numerous variations and modifications will become apparent to those skilled in the art once the above disclosure is fully appreciated. It is intended that the following claims be interpreted to embrace all such variations and modifications.

What is claimed is:

1. A method for synchronizing a decoded interlaced field data stream with an interlaced field display, wherein the method comprises:
   receiving a previous frame having a last field;
   receiving a current frame having a first field, a second field, and a repeat-first-field flag, wherein said last field, said first field, and said second field each have a polarity;
   comparing the polarities of said last field and said first field; and
   if said polarities are different, displaying said first field and said second field in that order and repeating said first field in accordance with said repeat-first-field flag; and
   if said polarities are equal, displaying said first field and said second field in reversed order and repeating said second field in converse accordance with said repeat-first-field flag.

2. A method for synchronizing a decoded interlaced field data stream with an interlaced field display, wherein the method comprises the steps of:
   determining a previous-frame last-field flag $L_{t-1}$, wherein said last-field flag $L_{t-1}=0$ when a previous flame has a top field displayed last, and wherein said last-field flag $L_{t-1}=1$ when the previous frame has a bottom field displayed last;

determining a desired current-frame first-field flag $F_t$, wherein said desired first-field flag $F_t=1$ when a top field in a current frame temporally precedes a bottom field, and wherein said desired first-field fag $F_t=0$ when the bottom field in the current frame temporally precedes the top field;

determining a current-frame repeat-first-field flag $R_t$, wherein said flag $R_t=1$ to indicate a desired pulldown execution, and wherein said flag $R_t=0$ to indicate a desired pulldown non-execution; and determining a pulldown execution flag $E_t$ according to the equation $E_t=L_{t-1}\oplus F_t\oplus R_t$, wherein said flag $E_t$ is asserted to indicate a pulldown execution.

3. The method of claim 2, wherein the previous-frame last-field flag $L_{t-1}$ is determined by a desired previous-frame first-field flag $F_{t-1}$, and a previous frame repeat-first-field flag $R_{t-1}$ according to the equation $L_{t-1}=F_{t-1}\oplus R_{t-1}$, wherein the desired previous-frame first-field flag $F_{t-1}=1$ when a top field in the previous frame temporally precedes a bottom field, and wherein said desired previous-frame first-field flag $F_{t-1}=0$ when the bottom field in the current frame temporally precedes the top field.

4. A system for synchronizing a decoded interlaced field data stream with a interlaced field display, wherein the system comprises:

an MPEG decoder configured to receive an MPEG video data stream, wherein said decoder is further configured to decode said data stream to produce for each frame (i) a top field T, (ii) a bottom field B, (iii) a top-field-first flag F, and (iv) a repeat-first-field flag R;

a display processor coupled to receive said flags, wherein said processor is configured to determine a previous-frame last-field flag L, wherein said processor is further configured to determine a pulldown execution flag E, wherein said processor is still further configured to determine a display sequence of fields for each frame, wherein said display sequence is T,B,T when L is asserted and E is asserted, is T,B when L is asserted and E is de-asserted, is of B,T,B when L is de-asserted and E is asserted, and is of B,T when L is de-asserted and E is de-asserted.

5. The system of claim 4, wherein the pulldown execution flag E is determined by flags L, F, and R according to the equation $E=L\oplus F\oplus R$.

6. The system of claim 5, wherein the L flag is determined by the exclusive-or (XOR) of the top-field first flag associated with a previous frame and the repeat-first-field flag associated with a previous frame.

7. A system for synchronizing a decoded interlaced field data stream with a interlaced field display, wherein the system comprises:

an MPEG decoder configured to receive an MPEG video data stream, wherein said decoder is further configured to decode said data stream to produce for each frame (i) a top field T, (ii) a bottom field B, (iii) a top-field-first flag F, and (iv) a repeat-first-field flag R; and a display processor coupled to receive said flags, wherein said processor is configured to determine a previous-frame last-field flag L, wherein said processor is further configured to determine a pulldown execution flag E, wherein said processor is still further configured to determine a display sequence of fields for each frame, wherein said display sequence is of T,B,T when L is asserted and E is asserted, is of T,B when L is asserted and E is de-asserted, is of B,T,B when L is de-asserted and E is asserted, and is of B,T when L is de-asserted and E is de-asserted;

wherein the L flag is determined by the exclusive-or (XOR) of the top-field first flag associated with a previous frame and the repeat-first-field flag associated with a previous frame.

8. The system of claim 7, wherein the pulldown execution flag E is determined by flags L, F, and R according to the equation $E=L\oplus F\oplus R$.

9. The system of claim 7, further comprising a video encoder coupled to said display processor.

10. The system of claim 9, further comprising a video monitor coupled to said video encoder.

* * * * *